United States Patent [19]
Becker et al.

[11] Patent Number: 6,049,627
[45] Date of Patent: *Apr. 11, 2000

[54] COVERT DIGITAL IDENTIFYING INDICIA FOR DIGITAL IMAGE

[75] Inventors: Glenn Becker, Alexandria, Va.; Salam H. Dahbour, Gaithersburg, Md.

[73] Assignee: Thomason Information Services, Inc., Boston, Mass.

[*] Notice: This patent issued on a continued prosecution application filed under 37 CFR 1.53(d), and is subject to the twenty year patent term provisions of 35 U.S.C. 154(a)(2).

[21] Appl. No.: 08/864,150

[22] Filed: May 28, 1997

[51] Int. Cl.[7] ............................................. G06K 9/00
[52] U.S. Cl. .......................... 382/181; 382/232; 380/3; 380/4
[58] Field of Search ......................... 382/232, 181, 382/137; 386/94; 380/4

[56] References Cited

U.S. PATENT DOCUMENTS

| | | |
|---|---|---|
| 4,776,013 | 10/1988 | Kafri et al. ........................ 380/54 |
| 5,287,407 | 2/1994 | Holmes ............................. 380/4 |
| 5,530,751 | 6/1996 | Morris ............................. 380/4 |
| 5,530,759 | 6/1996 | Braudaway et al. ............... 380/54 |
| 5,568,550 | 10/1996 | Ur .................................. 380/3 |
| 5,613,004 | 3/1997 | Cooperman et al. ............. 380/28 |
| 5,636,292 | 6/1997 | Rhoads ........................... 382/232 |
| 5,822,676 | 10/1998 | Hayashi et al. ................. 386/94 |

*Primary Examiner*—Jose L. Couso
*Assistant Examiner*—Anh Hong Do
*Attorney, Agent, or Firm*—St. Onge Steward Johnston & Reens LLC

[57] ABSTRACT

A method and system for affixing covert identifying indicia to a digital image document, by altering pixel luminance and/or saturation in the image in selected areas of the image to a selected differential in luminance and/or saturation. The differential in luminance and/or saturation is selected to be in a range which is minimally detectable by the human eye. The identifying indicia may be detected by checking the digital document for patterns of differential luminance and/or saturation in the selected range of the differential.

36 Claims, 6 Drawing Sheets ns, such as graphic images and text images, so that the publisher of that document may identify copies of the digital document as reproductions of the publisher's materials by using a detection method in accordance with the invention.

COVERT DIGITAL IDENTIFYING INDICIA FOR DIGITAL IMAGE

FIELD OF THE INVENTION

The invention relates to a method and system for embedding identifying indicia, minimally detectable to the human eye, in digital documents such as graphic images and text images, so that the publisher of that document may identify copies of the digital document as reproductions of the publisher's materials by using a detection method in accordance with the invention.

BACKGROUND OF THE INVENTION

The increasing use of electronic media for publication of images and text, for example on the world wide web, has created the risk to the publisher or other copyright owner of loss of control over unauthorized reproductions of the published materials. Web browsers such as the Netscape® software and the Microsoft® Internet Explorer software allow the user to instantly copy and store digital images available on the world wide web. Images published on CD-ROM, such as "clip art" and photo image collections, are similarly easily copied. The owners of copyrights in such digital images may in some cases be deterred from making full use of the distribution channels for such images that are provided by electronic distribution on CD-ROM or via the internet and the world wide web. In other cases, the publisher will take that risk, but will charge higher prices to authorized customers to recover some of the losses from unauthorized copying.

It would be desirable therefore to provide a covert digital identifying indicia affixed to digital images, which is minimally detectable to the human eye, so that copies of the digital images could be identified by the copyright owner as reproductions of its images by application of the appropriate detection method. It would be desirable that such identifying indicia be undetectable so that the appearance of the image is not defaced or altered so as to be unusable. Further, it would be desirable for such identifying indicia to be robust, in the sense that copies of the images would retain the identifying indicia despite alteration of the digital image. The identifying indicia should survive lossy compression procedures typical of digital images, for example, such as are associated with the JPEG format for digital images. The identifying indicia should also survive common image modifications possible with graphics software, such as cropping, rotation, resizing, and, in the case of color images, conversion to gray scale images, and still be detectable using an associated detection method. In this way, a publisher of copyrighted images, such as a photo archive or "clip art" publisher, could easily determine if a suspected unauthorized copy in fact was a copy of an image belonging to the publisher, without needing to check a massive collection of images to ascertain if the image belonged to the publisher.

A number of approaches have been proposed to apply identifying information to digital objects, such as graphic images, sound files, or software.

U.S. Pat. No. 5,287,407 to Holmes discloses a method of identifying copies of software by overwriting blocks of data in the software with information about when, and by whom, the copies are made. This method would not be usable in connection with digital images, as it assumes the availability of a blank block of data suitable for encoding copy information. In any event, such a method, if used in a digital image, would require that such information be included at the end of a file, where it could be removed during cropping or other alteration of the image. The data block could not be included in some other portion of the digital file, as it would affect the quality of the image.

U.S. Pat. No. 5,530,759 discloses a method of digital watermarking of graphic images. Digital watermarking involves the affixation of a visible marking to the digital image. The purpose of the digital watermark is to make an image suitable for use in study, but render it unsuitable for copying for republication. The patent describes altering the brightness of select pixels in the digital image to a uniform intensity that defines the watermark, e.g., the brightness of dark pixels are increased, and the brightness of bright pixels are reduced, to provide a clear, visible watermark image. It is to be appreciated that if the watermark is large, it effectively destroys the usefulness of the image by altering it so that details are no longer in their original visible state. But if the watermark is small, then it can be removed by cropping of the electronic image. A further disadvantage of this system is that it requires maintaining separate databases of marked and unmarked images, one for advertising images available for reproduction, or for other study, the other for authorized reproduction.

U.S. Pat. No. 4,776,013 to Kafri discloses a method of encrypting images prior to transmission by encoding the image by a method that selectively substitutes pixel values in the original image grid with pixel values selected from a master grid, a complement of the pixel values of a master grid, or a randomly selected pixel value. This method alters the image so it is not viewable, and would not be usable to encode an invisible identifying indicia, because such indicia would affect the viewability of the original image.

SRA International of Arlington, Va., has developed a method known as ImPrint™ that lightens the blue components in an image to affix an identifying watermark. The watermark produced by this technique, and other techniques to alter color components in an image, will not survive conversion to gray scale. Also, it is dependent on the presence of sufficient blue (or other color) components to allow the image to be watermarked.

Digimarc Corporation of Portland, Oreg., has developed a method known as Picture Marc™. This is an adaptive method to modulate variances in an image in proportion to the local variations in an image. This technique does not provide a standard method of affixing an identifying indicia to an image, and detecting the indicia at a later time, as each image must be separately analyzed.

High Water Designs, Inc. of Bedford, N.H., has developed a method known as FBI™ that embeds a binary code in image regions with high activity. This method operates in the frequency domain, and the binary code will be lost if the image is rotated by more than about 10 degrees, or if the image is scaled outside a size range of about 80–120 percent, or if more than about 30 percent of the image is cropped.

None of the prior art systems are directed to a minimally detectable identifying indicia that is robust, which survives common data compression methods, as well as surviving cropping, rotation, scaling, and conversion to gray scale, and which still is detectable using an appropriate detection method.

SUMMARY OF THE INVENTION

It is an object of the invention to provide a method of affixing a covert identifying indicia to a digital document which is minimally detectable to the human eye when the document is displayed, and which identifying indicia is robust in that it will not be lost during data compression, rotation, scaling, cropping or gray scale conversion. It is an object of the invention to provide a digital document that has affixed to it such a minimally detectable identifying indicia. It is an object of the invention to provide a method of detecting the digital identifying indicia on the document or a copy of the document using statistical means, without requiring direct visual inspection. These objects, and other objects as disclosed in this application, are achieved as described below.

The present invention provides for covertly applying an identifying indicia, for example, the publisher's trademark or logo, or an arbitrary pattern, to an existing image. The identifying indicia is applied to the existing image by adjustment of the pixel values in the image in a selected way. This is accomplished in the spacial domain, e.g., the pixel values in the pixel spacial array are adjusted to embed the identifying indicia in the existing image at specific locations. Preferably, the identifying indicia are affixed to the existing image across the entire pixel matrix of the image, so that the indicia are not lost through cropping of the image. The identifying indicia are affixed by adjustment of the pixel luminance or saturation at positions corresponding to the desired position of the identifying indicia to a selected differential value of luminance or saturation. Specifically, a method of affixing a covert digital identifying indicia to a digital image, and a digital document having a covert identifying indicia, in accordance with the invention, comprises the steps of: (1) providing an input image, having a plurality of adjacent pixel units, each having a control quality selected from the group consisting of luminance and saturation, to a processor; (2) providing an identifying indicia template input having an identifying indicia image to the processor; (3) combining the input image and identifying indicia template input in the processor to generate an output image containing covert identifying indicia, by altering the control quality of pixel units in the input image, at positions selected to correspond to the position of the identifying indicia image, to a selected difference in the control quality, the selected difference in control quality being in a range selected to be minimally detectable to the human eye. In the preferred embodiment, the step of altering the control quality of pixel units in the input to a selected difference in control quality comprises determining the mean of the control quality of adjacent pixel units, and altering the control quality of one adjacent pixel unit to a value equal to about the mean of the control quality less one half of the selected difference in control quality, and altering a second adjacent pixel unit to a value equal to about the mean of the control quality plus one half of the selected difference in control quality. In the embodiment accomplished through adjustment of luminance, preferably, the selected difference in luminance is selected to be in the range of about 0.005 to about 0.2, where the pixel luminance range is 0–1.0.

The existence of the covert identifying indicia may be detected in a copy of the covertly labeled image by a reverse application of the above method. In particular, the amount of the control quality, whether luminance or saturation, is determined in adjacent pixels in the copy of the digital image. The difference in the control quality among adjacent pixels is then calculated, and this matrix of differential control qualities is then compared against a predetermined control quality difference range to determine if any of the calculated differences are within the predetermined control quality difference range. An output is then generated containing a contrast area against a background area (for example, black on white), the contrast area being positioned at locations in the matrix of differential control qualities where the step of comparing determines that the calculated difference is within the predetermined control quality difference range. In the preferred embodiment, to allow for noise and other random errors, the step of comparing comprises determining the difference between the calculated difference and a predetermined difference standard; and determining if the difference between the calculated difference and the predetermined difference standard is less than a predetermined similarity threshold.

A further aspect of the invention is the ability to detect from copies of images, whether others are using the method of the invention, without being in possession of the difference standard being used by the others. The method comprises the steps of determining an amount of a control quality, the control quality being selected from the group consisting of luminance and saturation, of adjacent pixel units in the digital image; calculating the difference in the amount of the control quality of adjacent pixel units in the digital image; storing the calculated difference in the control quality of adjacent pixel units in the digital image; determining a range containing the most common calculated differences in the control quality obtained; and generating an output image containing a contrast area against a background area, the contrast area being positioned at locations corresponding to locations in a matrix of the calculated differences where the calculated differences are within the ranges containing the most common calculated differences in the control quality obtained.

Other objects, aspects and features of the present invention in addition to those mentioned above will be pointed out in detail or will be understood from the following detailed description provided in conjunction with the accompanying drawings.

BRIEF DESCRIPTION OF THE DRAWINGS

The foregoing aspects and other features of the invention are explained in the following description, taken in connection with the accompanying drawings, wherein.

DETAILED DESCRIPTION OF THE INVENTION

Figure 1:
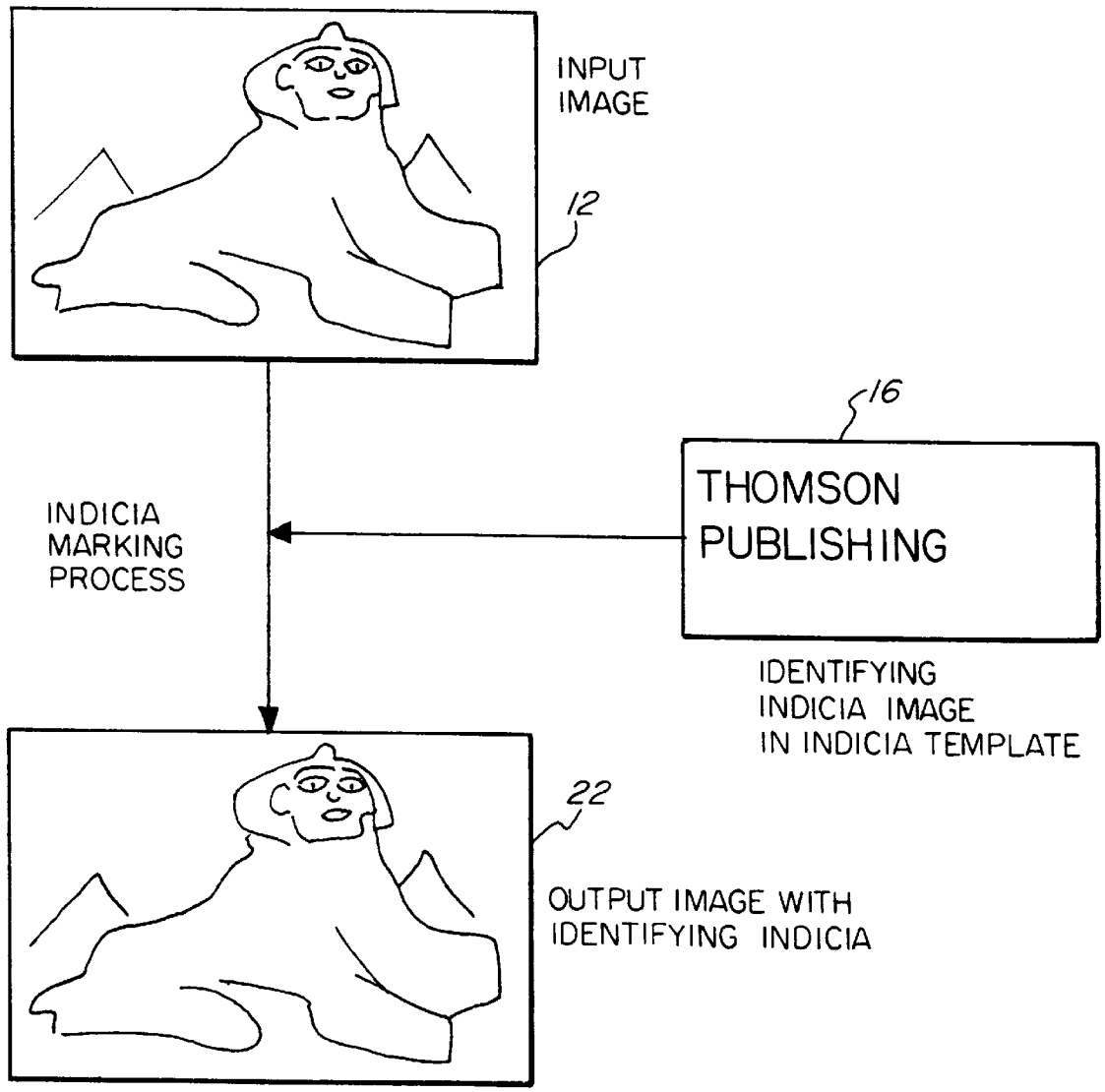
FIG. 1 is an example showing a sample input image and a sample identifying indicia template which are combined to generate an output image containing the identifying indicia which is undetectable to the human eye.

Digital images comprise a matrix of data points representing each pixel in the image. In monochrome (grayscale)

images, a single sample value, luminance, is typically used to define each pixel in the image. In color images, three sample values, one sample representing the luminance and two samples representing the color of the image are used. The fundamental qualities of color are luminance (the degree of brightness), hue (the color) and saturation (the degree of paleness of the color, ranging for example from pastels to solid colors). One mathematical color space used to define the pixels in an image is the standard red/green/blue ("RGB") color space. Another standard mathematical color space is the YUV color space, in which Y represents luminance, and U and V are mathematical representations of the color. The YUV model derives from color television transmission standards such as the PAL (phase alternating line) standard. As persons skilled in the art will recognize, there are standard means of converting color information between the RGB and YUV color models, and the luminance/hue/saturation color model may be derived from both YUV and RGB color models.

The present invention operates by adjusting a control quality, which is either the luminance or saturation values of pixels or pixel units in an existing digital image. As used herein, "pixel units" refers to both individual pixels, or groups of pixels (for example a 2×2 group of pixels). In the preferred embodiment, the method will operate on individual pixels, but the invention may also be used on groups of pixels if desired. The luminance or saturation of selected pixel units in the pixel array are adjusted so that the pixel units are set to a selected differential luminance or saturation. The pixel units are selected to embed an identifying indicia, such as a publisher's name or logo, or a pattern incorporating same, or another dither pattern of some type, into the digital image, at selected positions in the pixel array. Preferably, the identifying indicia is embedded in the existing digital image across the entire pixel array of the existing digital image, so that the indicia are not lost through cropping of the image. The differential in luminance or saturation of the selected pixel units is chosen to be in a range which is not detectable to the human eye, but can readily be extracted from the image or subsequent copies of the image.

The invention as described herein generally discusses manipulation of a single parameter, luminance or saturation, however, it is to be appreciated that the invention as disclosed and claimed herein encompasses both methods, and that either one or both such parameters may be adjusted in a single document, all within the scope of the invention. For example, it may be desirable for different parties, such as a copyright owner and a publisher under license, to both embed identifying indicia separately in the digital image document, one being embedded by adjustment of saturation, the other by adjustment of luminance.

The present invention is applicable to any type of electronic image or document that defines a pixel array having saturation or luminance values. Thus, it is applicable whether the image is text, or a graphic image such as a photograph or clip art, or video. As used herein "image" is intended to include all such different types of content.

Of the two control qualities, luminance and saturation, luminance is the preferred value to control. It has been found that luminance adjustments in accordance with the invention will tolerate lossy compression much better than will saturation adjustments. In the embodiment accomplished through adjustment of luminance, preferably, where the entire range of pixel luminance is 0–1.0, the selected difference in luminance is selected to be in the range of about 0.005 to about 0.2, and more preferably, in the range of about 0.04 to about 0.08, and most preferably, the selected difference in luminance is selected to be about 0.04. The upper range of the selected difference in luminance provides a more durable identifying indicia, which will better survive lossy compression techniques, however, it is more likely to be visible to the human eye in images with flat textures. The lower range of the selected difference in luminance is less likely to become detectable when applied in images with flat textures, but is less robust as it may become lost using lossy compression techniques. In testing of the invention it was found that the identifying indicia survived JPEG compression up to level 10 of 100 with a selected difference in luminance of 0.04 and that it survived JPEG compression up to level 20 of 100 with the selected difference in luminance set to 0.08. Other testing of luminance adjustments to affix identifying indicia in accordance with the invention showed that the identifying indicia survived scaling of an image from 63% to 200% of its original width, and that it survived rotation through 90, 180, 270 and 360 degrees.

In a preferred embodiment, the step of altering the control quality (luminance or saturation) of pixel units in the input image to a selected difference comprises determining the mean of the chosen control quality of the adjacent pixel units, and altering the control quality of one adjacent pixel unit to a value equal to about the mean of the control quality less one half of the selected difference in control quality, and altering a second adjacent pixel unit to a value equal to about the mean of the control quality plus one half of the selected difference in control quality. It should be noted that in this application, particularly as described with reference to FIGS. 3 and 4, the preferred embodiment described applies the method of the invention to adjacent pixels, e.g., pixels at locations (x,y) and (x, y+1), however the invention herein also encompasses use of the method by adjustment of pixels located in regular or irregular spaced intervals, as, for example, selected by a standard algorithm or by a random number generator. Such marking will be less detectable than marking of adjacent pixels, however it may create greater complexity, and a less robust identifying indicia.

It is further to be appreciated that in the preferred embodiment, the selected difference in control quality applied to the selected pixels is a fixed difference, e.g., the same differential is applied to all pixels in the image. However, it is also possible to apply a variable control quality, according to some pattern or algorithm, to the selected pixels. Use of a variable control quality would render the identifying indicia even more difficult to detect. However, for most applications this additional concealment would be unnecessary.

Affixation of Identifying Indicia

Figure 2:
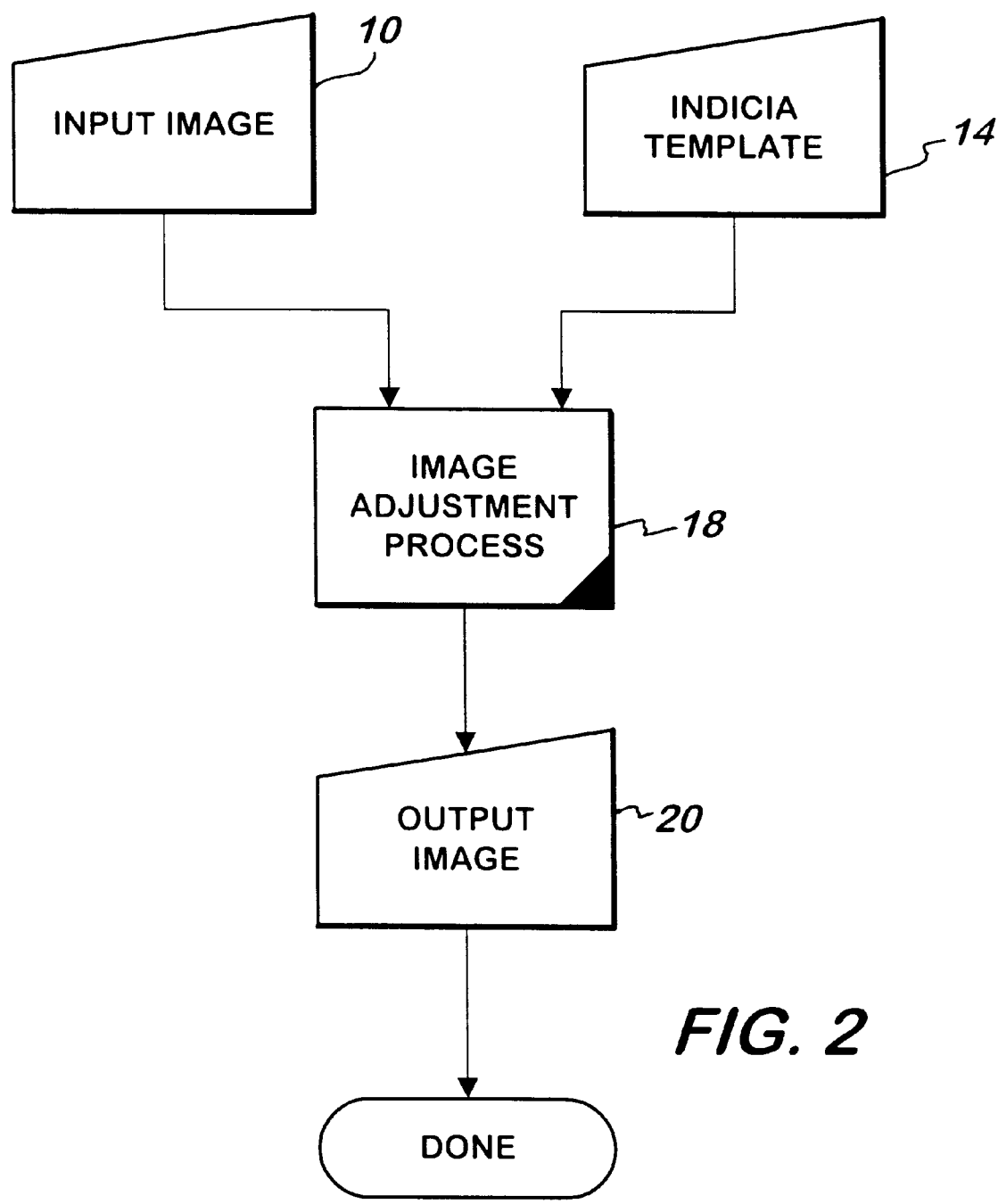
FIG. 2 is a high level flow chart for the method of affixing a minimally visible identifying indicia in accordance with the invention.

Referring now to FIG. 2, the overall flow chart for affixing the identifying indicia is shown. An existing image is represented as box 10. This image is combined with the identifying indicia contained in an identifying indicia template shown in box 14 through the method of the invention during the step of box 18, leading to formation of an output image containing the covertly applied digital identifying indicia as shown in box 20. An example of the process is shown in FIG. 1, wherein an input image 12 (an illustration of the Sphinx in Egypt) is adjusted to apply identifying indicia in the form of the publisher's name ("Thomson Publishing") to result in an output image 22 in which the identifying indicia is undetectable by the human eye. Preferably, as in the example, the identifying indicia template input comprises a black and white image, and the identifying indicia image comprises a black image.

Figure 3:
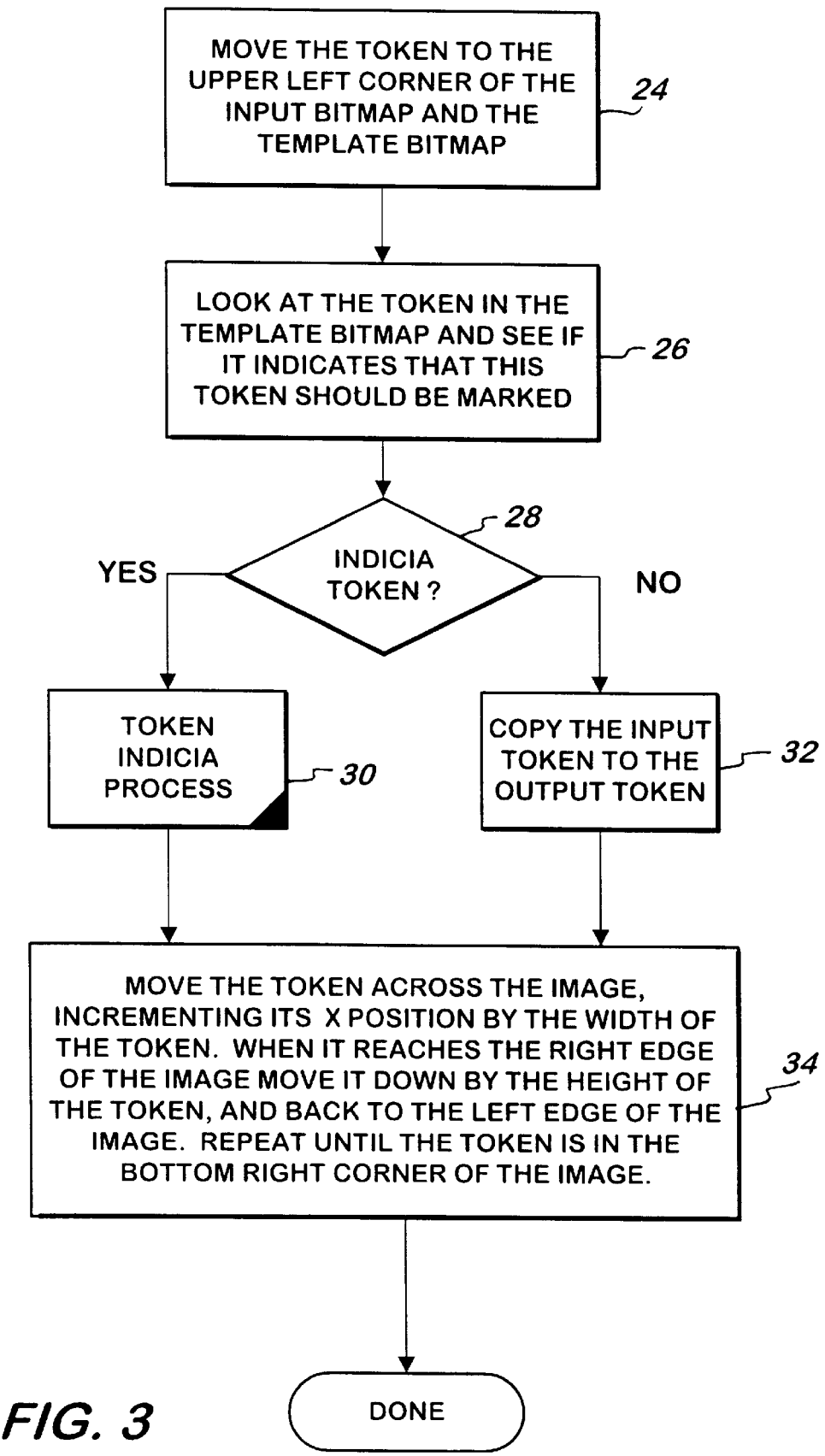
FIG. 3 is a flow chart showing an embodiment of the steps of the method of affixing a minimally visible identifying indicia in accordance with the invention.

A preferred embodiment of the method of the invention is illustrated in FIG. 3. In FIG. 3, the method is applied by sequential scanning of the input image and the identifying indicia template by evaluation of adjacent tokens. A token, as used herein, is a group of pixels of width w and height h. An input token is scanned across an input image bitmap containing the image which will have the identifying indicia affixed to it. A template token is simultaneously scanned across an identifying indicia template bitmap containing the identifying indicia image. An output token, copied from the input token but having an adjusted control quality (luminance or saturation) in selected pixel units is generated where the evaluation of the template token identifies the presence of the identifying indicia image. The output image bitmap is built from a series of output tokens generated through the above described method.

This procedure speeds up the process of marking the input image with the identifying indicia by permitting blocks of pixels to be scanned in the indicia template to determine if any of the identifying indicia appears and that the input image should be processed to affix the identifying indicia. As shown in box 24 of FIG. 3, the tokens are initially placed in the same respective location in the input image and the identifying indicia template. As shown in boxes 26–30, if the template token scanning the indicia template reveals the existence of the identifying indicia, then each pixel in the token will be processed to apply the identifying indicia at a corresponding position in the input image. Upon completion of the indicia embedding process in one position, the tokens will advance to the next position, as shown in box 34. If no identifying indicia appear in the template token, then the tokens proceed to the next position, as shown in boxes 32–34. Preferably, as shown in box 34 the tokens scanning the input image and the indicia template will travel along a standard path, such as travelling left to right across the image, then moving down by the height of the token, and travelling right to left across the image, down again, left to right again, and repeating these steps until the token reaches the bottom right corner of the images.

Figure 4:
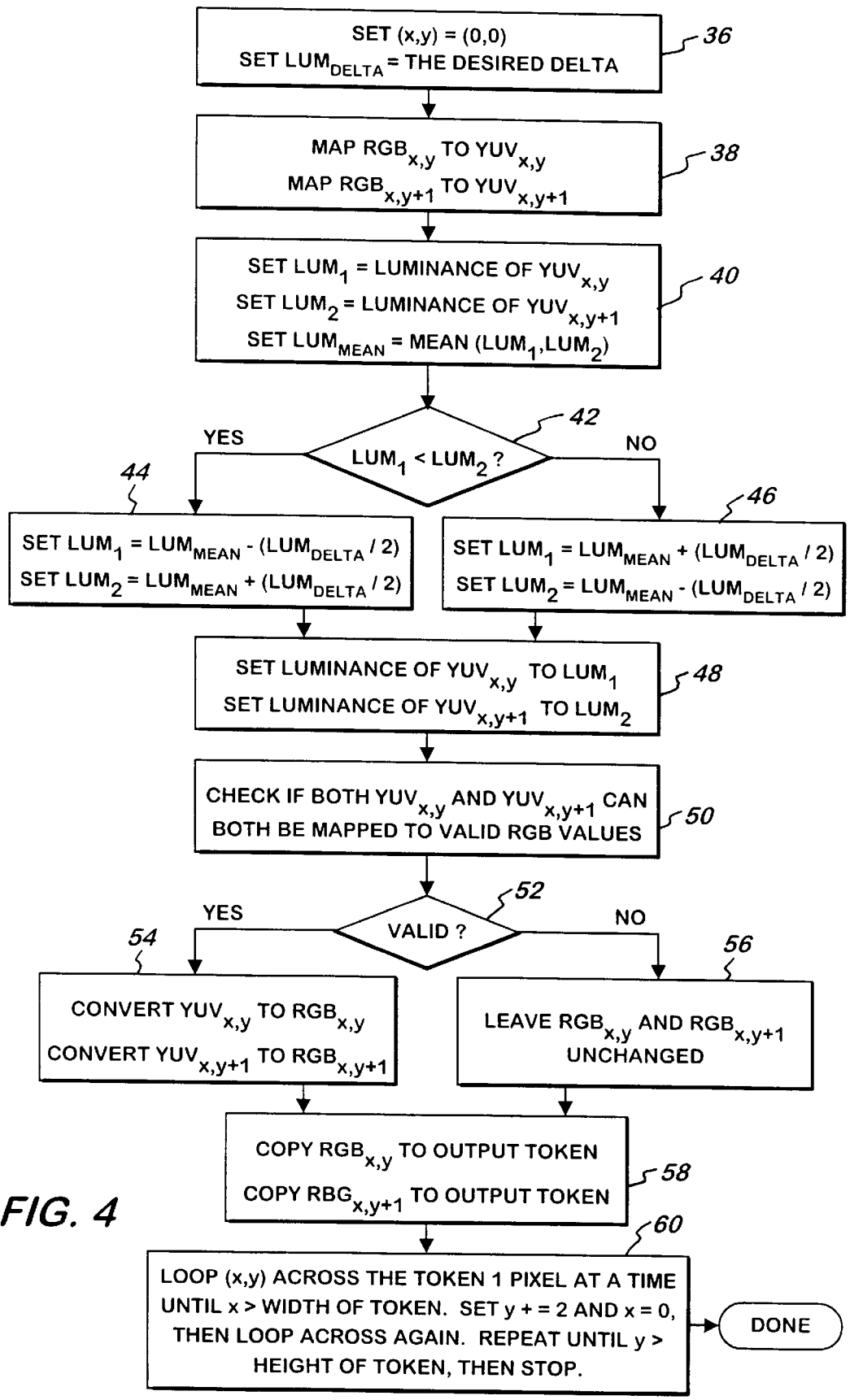
FIG. 4 is a flow chart showing a detailed embodiment of the steps of the method of affixing a minimally visible identifying indicia in accordance with the invention by adjustment of pixel luminance.

FIG. 4 is the flow chart showing the operation of the method of the invention applied to pixels within a token where there is an identifying indicia to be applied. FIG. 4 describes the preferred embodiment of adjustment of luminance of pixels in an input token. In FIG. 4, $\text{Lum}_{delta}$ is the difference in luminance in two pixels. $\text{RGB}_{x,y}$ is the value of pixel (x,y) in the RGB color model. $\text{YUV}_{x,y}$ is the value of pixel (x,y) in the YUV color model. In box 36 the desired differential luminance is selected. As noted above this difference is preferably in the range of 0.005–0.2, where the pixel luminance ranges from 0–1.0. In box 38, each pixel is sequentially mapped from the RGB color model to the YUV color model. In box 40, the luminance of adjacent pixels (x, y) and (x, y+1) in the YUV color model are determined, and the mean of the luminance of the two adjacent pixels is determined. As shown in boxes 42–48, if the luminance of pixel (x,y) is less than the luminance of pixel (x, y+1), then the luminance of pixel (x,y) is adjusted to the mean of the luminance of the two pixels less one half the selected differential luminance, and the luminance of pixel (x, y+1) is adjusted to the mean luminance of the two pixels plus one half the selected differential luminance. If the luminance of pixel (x,y) is greater than (or equal to) the luminance of pixel (x, y+1), then the luminance of pixel (x,y) is adjusted to the mean of the luminance of the two pixels plus one half the selected differential luminance, and the luminance of pixel (x, y+1) is adjusted to the mean of the luminance of the two pixels less one half the selected differential luminance.

The adjusted YUV values from the above step are then checked to determine that they can be mapped to valid RGB values in box 50. If the RGB values are not valid, then the RGB values of the pixels of the input image token are copied to the output image token without adjustment or alteration, as shown in boxes 56–58. If the adjusted RGB values are valid, then the adjusted YUV values for pixels (x,y) and (x, y+1) are converted to the RGB model and the adjusted RGB values are copied to the output token. In box 60 it is described how the process is repeated until the entire pixel array in the token has been processed in accordance with the method.

A simple image consisting of a 5×5 pixel matrix is used to demonstrate the adjustments to the input image using the present invention in the following example.

EXAMPLE 1

RGB color values of input image

|  | (68,70,95) | (30,32,57) | (31,32,62) | (53,54,84) |
|---|---|---|---|---|
| (110,113,130) |  |  | (31,35,60) | (27,31,56) |
| (64,67,82) | (58,61,78) | (36,41,60) |  | (53,58,78) |
| (101,108,118) | (88,94,106) | (33,39,53) | (40,46,62) |  |
| (82,89,99) | (88,94,106) | (45,51,65) | (35,42,58) | (43,50,66) |

Luminance values of input image pixels (input bitmap)

|  | 0.2833 | 0.1343 | 0.1377 | 0.2240 |
|---|---|---|---|---|
| 0.4472 |  |  | 0.1437 | 0.1281 |
| 0.2659 | 0.2433 | 0.1634 |  | 0.2305 |
| 0.4198 | 0.3670 | 0.1522 | 0.1805 |  |
| 0.3453 | 0.3670 | 0.1992 | 0.1637 | 0.1950 |

Indica Template (template bitmap)

|  | 0 | 0 | 0 | 0 |
|---|---|---|---|---|
| 0 |  |  | 0 | 0 |
| 0 | 0 | 0 |  | 0 |
| 0 | 0 | 0 | 0 |  |
| 0 | 0 | 0 | 0 | 0 |

Luminance values of indicia marked output image pixels (output bitmap)

|  |  |  |  | 0.2240 |
|---|---|---|---|---|
|  |  |  |  | 0.1281 |
| 0.2659 | 0.2433 |  |  |  |
| 0.4198 | 0.3670 |  |  |  |
| 0.3453 | 0.3670 | 0.1992 | 0.1637 | 0.1950 |

RGB color values of indicia marked output image

|  |  |  |  | (53,54,84) |
|---|---|---|---|---|
|  |  |  |  | (27,31,56) |
| (64,67,82) | (58,61,78) |  |  |  |
| (101,108,118) | (88,94,106) |  |  |  |
| (82,89,99) | (88,94,106) | (45,51,65) | (35,42,58) | (43,50,66) |

Detection of Identifying Indicia

Figure 5:
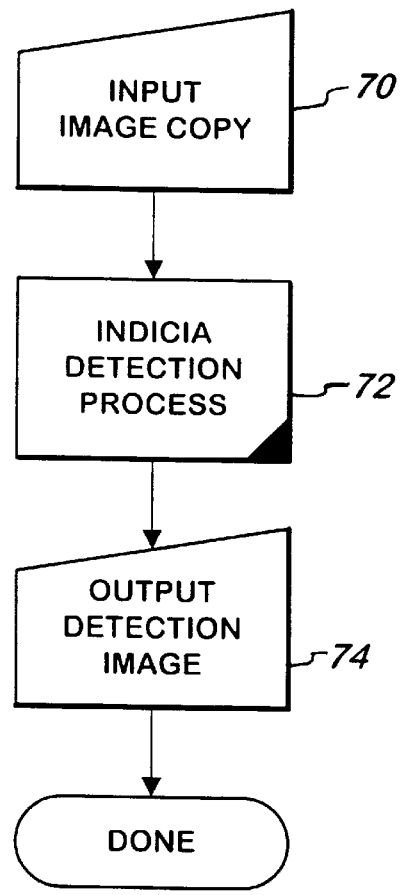
FIG. 5 is a high level flow chart for the method of detecting a minimally visible identifying indicia in accordance with the invention.
Figure 6:
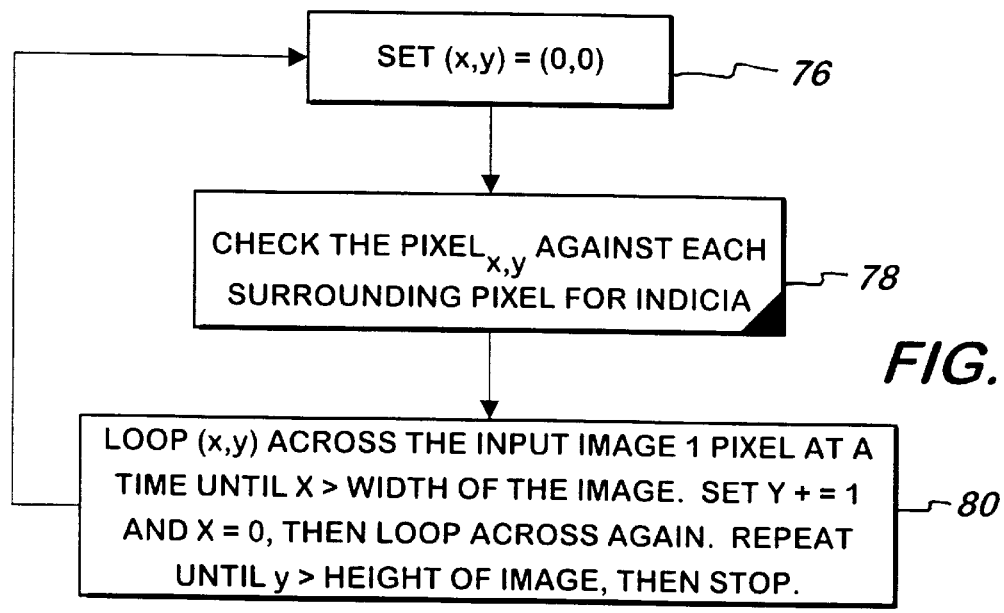
FIG. 6 is a flow chart showing an embodiment of the steps of the method of detecting a minimally visible identifying indicia in accordance with the invention.

The existence of the covert identifying indicia may be detected in a copy of the covertly labeled image by a reverse application of the above method. Referring to FIG. 5, a high level flow chart for the detection method is shown. In this method, the amount of the control quality, whether luminance or saturation, is determined in selected pixels in the input image copy to generate a graphic image that will correspond to the original template identifying indicia applied to the original digital output document, as shown in boxes 70–74. In the preferred embodiment, the detection method is applied to adjacent pixels, as shown in boxes 76–80 of FIG. 6.

The difference in the control quality among adjacent pixels is then calculated, and this matrix of differential qualities is then compared against a predetermined control quality difference standard or range to determine if the calculated difference is equal to the predetermined control quality difference standard or within the predetermined control quality difference range. For example, if the publisher routinely embeds identifying indicia by adjustment of luminance to a fixed differential of 0.4, then the predetermined control quality difference standard will be 0.4. Allowing for noise and error, the predetermined control quality difference range might be 0.035–0.045 in such case. Broader or narrower ranges may also be selected. In the present application, the term "predetermined control quality difference range" will mean both the standard described above, and the range containing the standard. An output is then generated containing a contrast area against a background area (for example, black on white), the contrast area being positioned at locations corresponding to locations in the copy of the digital image where the step of comparing determines that the calculated difference meets the predetermined control quality difference range. In the preferred embodiment, to allow for noise and other random errors, the step of comparing comprises determining the difference between the calculated difference and a predetermined difference range; and determining if the difference between the calculated difference and the predetermined difference range is less than a predetermined similarity threshold.

Figure 7:
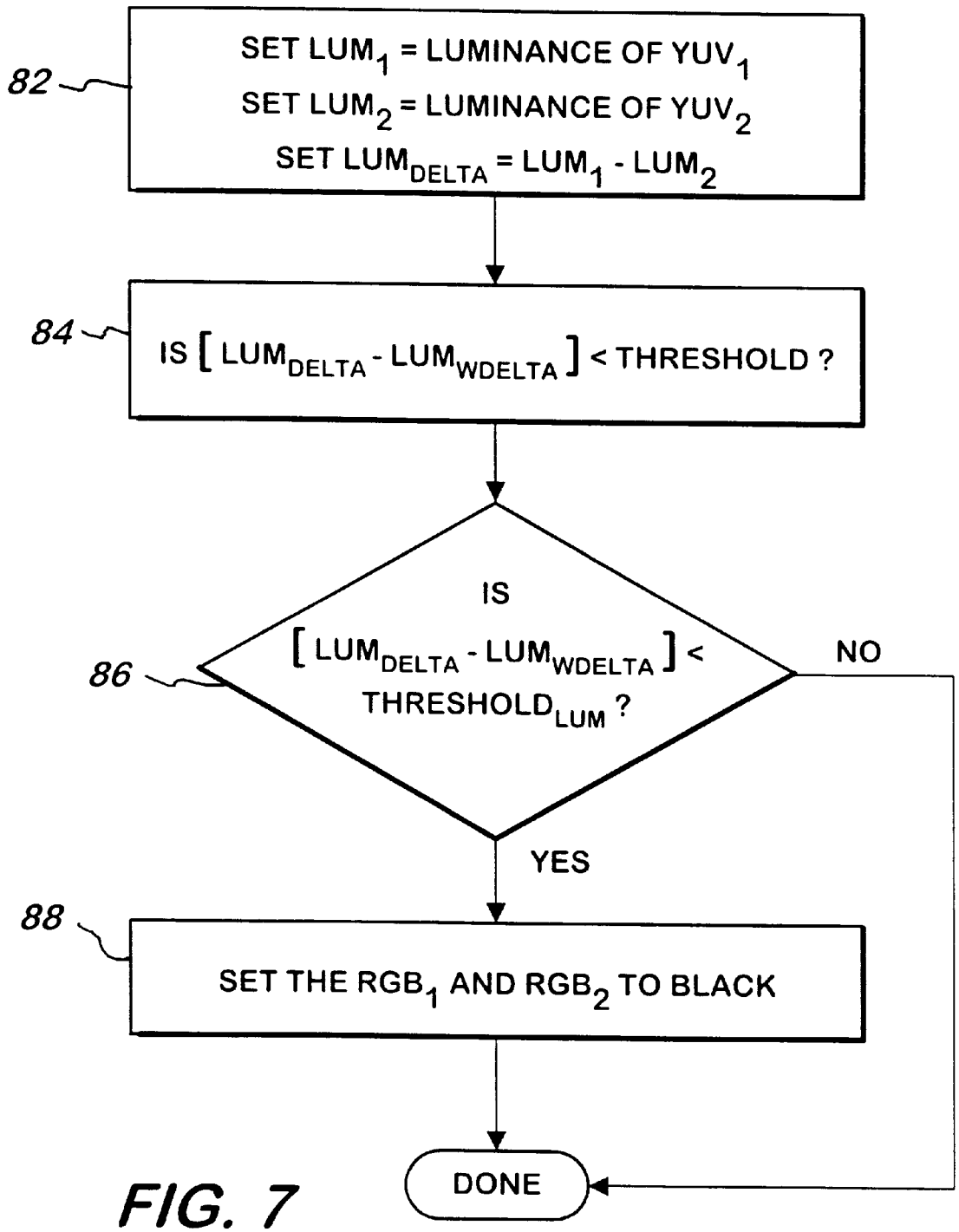
FIG. 7 is a flow chart showing a detailed embodiment of the steps of the method of detecting a minimally visible identifying indicia affixed by adjustment of pixel luminance.

Referring now to FIG. 7, which describes a preferred embodiment of detection of identifying indicia where luminance is used as the control quality, the following parameters are used. $YUV_1$ and $YUV_2$ are the values of the YUV color model for the pixels being checked for identifying indicia. $Lum_{wdelta}$ is the selected luminance differential standard indicating the presence of identifying indicia. $RGB_1$ and $RBG_2$ are the values in the RGB color model of the pixels being checked. In box 82, the difference in luminance $lum_{delta}$ of the adjacent pixels in the YUV color model is determined. This difference in luminance $lum_{delta}$ is compared in box 84 against the luminance differential $lum_{wdelta}$ to determine if the difference between the two values is below a predetermined threshold. If the difference is above the threshold, then, as shown in boxes 86 and 88 no output is generated, e.g., the output in the RGB value is white. If the difference determined by the step of box 84 is below the threshold, then the RGB values of the output is set to black, to indicate the presence of identifying indicia in visible output image. It should be noted that of course the initial value of the output may be black and the RGB output can set the output to white, where identifying indicia are detected, or contrasting color combinations may be used. This procedure continues until a sufficient portion, or all of the image, has been scanned to detect the identifying indicia.

A further aspect of the invention is the ability to detect from copies of images whether others are using the method of the invention, without having possession of the selected difference standard being used by the others. The method comprises the steps of determining an amount of a control quality, the control quality being selected from the group consisting of luminance and saturation, of adjacent pixel units in the digital image; calculating the difference in the amount of the control quality of adjacent pixel units in the digital image; storing the calculated differences in the control quality of adjacent pixel units in the digital image; determining a range containing the most common calculated differences in the control quality obtained; and generating an output image containing a contrast area against a background area, the contrast area being positioned at locations corresponding to locations in a matrix of calculated differences where the calculated differences are within the range containing the most common calculated differences in the control quality obtained. A further step is determining a range containing the second most common calculated differences in the control quality obtained; and generating an output image containing a contrast area against a background area, the contrast area being positioned at locations corresponding to locations in the digital image where the calculated differences are within the range containing the second most common calculated differences in the control quality obtained. This method allows detection of identifying indicia in digital documents by checking if the differential in the control quality correlates to any type of identifying indicia.

The method of the invention may be embodied in a system containing conventional computer components as follows. The system comprises a conventional personal computer using the Microsoft® Windows 95 operating system. The input image is stored in a digital storage media or device such as floppy disk, CD-ROM, or a hard drive, or a mass storage unit, or equivalent media. The identifying indicia is similarly stored in a digital storage media or device such as floppy disk, CD-ROM, or a hard drive, or a mass storage unit, or equivalent media, which may the same or different as the digital storage media or device where the input image is stored. The computer's digital processor is used to combine the input image and the identifying indicia template image to generate an output image containing the covert identifying indicia. The output image is then stored in a digital storage media or device, which again may be floppy disk, CD-ROM, or a hard drive, or a mass storage unit, or equivalent media, and which may be the same or different as the digital storage media or device where the input image and/or the identifying indicia template are stored.

The present invention provides an important and timely contribution to the art of digital image control, by providing an identifying indicia that is effective to positively identify a digital file, and which has a significant ability to survive data compression, cropping, scaling, rotation, and gray scale conversion.

It is to be appreciated that the foregoing is illustrative and not limiting of the invention, and that various changes and modifications to the preferred embodiments described above will be apparent to those skilled in the art. Such changes and modifications can be made without departing from the spirit and scope of the present invention, and it is therefore intended that such changes and modifications be covered by the following claims.

What is claimed is:

1. A method of affixing a covert digital identifying indicia to a digital image, comprising the steps of:

providing, to a processor, an input image defined by an array of pixel units each pixel unit having a control quality selected from the group consisting of luminance and saturation;

providing to said processor an identifying indicia template defining an identifying indicia image and formed of a plurality of bits which have a spatial correspondence with pixels in said array of pixel units;

altering, in said array of pixel units defining said input image, the control quality of pixel units which have said spatial correspondence, to a pre-selected difference level, said pre-selected difference level being in a range selected to render the altered pixel units minimally detectable to the human eye when they are displayed;

generating, from said processor, an array of pixels defining an output image, said array of pixels in said output image being comprised of said input image with said altered pixel units, so as to embed in said output image covert detectable identifying indicia which represent said identifying indicia image.

2. A method in accordance with claim 1 wherein said step of altering said control quality of pixel units in said array of pixel units to a pre-selected difference in control quality comprises the steps of:

determining the mean of the control quality between pixel units having said spatial correspondence, and altering the control quality of at least one of said latter pixel units to a value substantially equal to said mean of the control quality less a first portion of the pre-selected difference in control quality, and altering a second pixel unit associated with at least one of said latter pixel units to a value substantially equal to said mean of the control quality plus a second portion of the pre-selected difference in control quality.

3. A method in accordance with claim 1 and further comprising the steps of:

defining a token encompassing a group pixels;

comparing tokens of bits from said identifying indicia template with corresponding tokens of pixels from said array of pixel units defining said input image wherein said altering step alters the control quality of pixel units of said input image within a token at token positions where said comparing step identifies the presence of said identifying indicia image.

4. A method in accordance with claim 2, wherein said first and second portions of the pre-selected difference level in the control quality comprise one half thereof.

5. A method in accordance with claim 3 wherein said tokens comprise a predefined pixel matrix size of a width w and height h measured in pixels, wherein the control quality of adjacent pixel units of said input image in said tokens is altered when said comparing of said tokens identifies the presence of said identifying indicia image.

6. A method in accordance with claim 5, wherein said input image and said identifying indicia template are simultaneously processed by said processor to alter said control quality of adjacent pixel units of said input image within tokens formed of pixel units in said input image.

7. A method in accordance with claims 3 wherein said adjacent tokens of said identifying indicia template are formed of pixel units located along a predefined path.

8. A method in accordance with claim 1 wherein said bits within the identifying indicia template are representative of a black and white image, and said identifying indicia image comprises bits representative of a black image.

9. A method in accordance with claim 1 wherein said control quality consists of luminance.

10. A method in accordance with claim 9 wherein said pre-selected difference in luminance is selected to be in a range from about 0.005 to about 0.2.

11. A method in accordance with claim 10 wherein said pre-selected difference in luminance is selected to be in a range from about 0.04 to about 0.08.

12. A method in accordance with claim 11 wherein said pre-selected difference in luminance is selected to be about 0.04.

13. A method in accordance with claim 1 wherein said control quality consists of saturation.

14. A method in accordance with claim 1, further comprising the steps of detecting said covert identifying indicia in a copy of said digital image wherein said copy is formed of an array of pixel units having said control quality, by:

determining the amount of the control quality of respective pixel units in the array of pixel units forming said copy;

calculating the difference in said control quality between selected pixel units in the array of pixel units of said copy of said digital image;

comparing the calculated difference with a predetermined control quality difference range to determine those pixel units representative of said covert identifying indicia when said calculated differences are within said predetermined control quality difference range; and generating an output image represented by an output array of pixel units for display, said output array including pixel units for which the comparing step yielded a difference in control quality that was within the predetermined control quality difference range, said pixel units in said output array producing, when displayed, a contrast area against a background area, said contrast area being positioned at spatial locations to reveal said covert identifying indicia in the array of pixel units forming said copy of the digital image.

15. A method in accordance with claim 14, wherein said comparing step further comprises:

comparing said calculated differences with a predetermined control quality difference range that is a predetermined similarity threshold.

16. A digital document containing covert identifying indicia, comprising a digital image defined by an array of adjacent pixel units, each pixel unit having a control quality selected from the group consisting of luminance and saturation; predetermined pixel units within said array having a pre-selected difference in control quality, said pre-selected difference in control quality being in a range selected to be minimally detectable to the human eye when said digital document is displayed, said pixel units having said pre-selected difference in control quality being positioned to define, in the aggregate within said array of pixel units, an embedded covert identifying indicia image.

17. A digital document in accordance with claim 16 wherein said control quality consists of luminance.

18. A digital document in accordance with claim 17, wherein said pre-selected difference in luminance is selected to be in a range from about 0.005 to about 0.2.

19. A digital document in accordance with claim 18 wherein said pre-selected difference in luminance is selected to be in a range from about 0.04 to about 0.08.

20. A digital document in accordance with claim 19 wherein said pre-selected difference in luminance is selected to be about 0.04.

21. A digital document in accordance with claim 16 wherein said control quality consists of saturation.

22. A digital document in accordance with claim 16 wherein said pre-selected difference in said control quality comprises the mean of the control quality of adjacent pixel units plus or minus a portion of said pre-selected difference in control quality.

23. A method of detecting covert identifying indicia in a digital image formed of an array of pixel units having a control quality, comprising the steps of:

determining the amount of the control quality of respective pixel units in said array of pixel units, said control quality being selected from the group consisting of luminance and saturation;

calculating a difference in the control quality between selected pixel units in said array of pixel units;

comparing the calculated differences with a predetermined control quality difference range to determine those pixel units representative of said covert identifying indicia when said calculated differences are within said predetermined control quality difference range;

generating an output image represented by an output array of pixel units, said output array including pixel units for which the comparing step yielded a difference in control quality that was within the predetermined control quality difference range, said pixel units in said output array being capable of producing a contrast area against a background area, said contrast area being positioned at spatial locations corresponding to locations for said covert identifying indicia in the digital image.

24. A method in accordance with claim 23, wherein said step of generating an output image further comprises the step of:

altering the control quality of those pixel units for which the comparing step yielded a difference in control quality that was within the predetermined control quality difference range, said altered control quality being selected at a level with which a visual display of the pixel units in said output image reveals said covert identifying indicia.

25. A method in accordance with claims 23 wherein said control quality consists of luminance.

26. A method in accordance with claims 23 wherein said control quality consists of saturation.

27. A method in accordance with claims 23 wherein said selected pixels are adjacent pixels.

28. A method in accordance with claim 27 wherein said control quality consists of luminance.

29. A method in accordance with claim 27 wherein said control quality consists of saturation.

30. A method of detecting covert identifying indicia in a digital image formed of an input array of pixel units having a control quality, comprising the steps of:

determining the amount of the control quality of adjacent pixel units in said digital image, said control quality of respective pixel units in said input array of pixel units being selected from the group consisting of luminance and saturation;

calculating and storing the differences in said amount of said control quality between adjacent pixel units in said input array of pixel units of said digital image;

determining a range for the most common calculated differences in said control quality generating an output image represented by an output array of pixel units for display, wherein pixel units from the input array of pixel units, for which the calculated control quality difference falls within the range, have a changed control quality to be capable of producing, when displayed, a contrast area with respect to a background display of pixel units whose control quality is outside the range, so as to reveal the covert identifying indicia embedded within the pixel units of said digital image.

31. A method in accordance with claim 30 wherein said control quality consists of luminance.

32. A method in accordance with claim 30 wherein said control quality consists of saturation.

33. A system for placing a covert identifying indicia within a digital image, comprising:

a digital input image, having a plurality of adjacent pixel units, each having a luminance, stored in a digital storage device;

an identifying indicia template having an identifying indicia image formed of a plurality of bits stored in a digital storage device, said bits having a luminance;

a digital processor programmed to combine said input image and said identifying indicia template so that the luminance of the pixel units and said bits is adjusted to generate an output image containing covert identifying indicia formed of a plurality of adjacent pixel units, each having a luminance, with certain of said adjacent pixel units having a pre-selected difference in luminance, said pre-selected difference in luminance being in a range selected to be minimally detectable to the human eye, said adjacent pixel units having said pre-selected difference in luminance being positioned to define said identifying indicia image; and a digital storage device for storing said output image containing covert identifying indicia.

34. A method of affixing a covert digital identifying indicia to a digital image, comprising the steps of:

providing an input image, having a plurality of adjacent pixel units, each having a hue, saturation, and luminance, to a processor;

providing to said processor an identifying indicia template input having a spatial correspondence with said input image and having an identifying indicia image in the form of a plurality of bits at predetermined spatial locations relative to said input image;

combining, in said processor, the pixel units of said input image with the bits of said identifying indicia template input to generate an output image containing covert identifying indicia by altering said saturation of adjacent pixel units in said input image, at positions selected to correspond to said identifying indicia image, to a selected difference in saturation, said selected difference in saturation being in a range selected to be minimally detectable to the human eye.

35. A method of affixing a covert digital identifying indicia to a digital image, comprising the steps of:

providing an input image, having a plurality of adjacent pixel units, each having a luminance, to a processor;

providing to said processor an identifying indicia template input having a spatial correspondence with said input image and having an identifying indicia image in the form of a plurality of bits at predetermined spatial locations relative to said input image;

combining, in said processor, the pixel units of said input image with the bits of said identifying indicia template input to generate an output image containing covert identifying indicia by altering said luminance of adjacent pixel units in said input image, at positions selected to correspond to said identifying indicia image, to a pre-selected difference in luminance, said pre-selected difference in luminance being in a range selected to be minimally detectable to the human eye.

36. A method in accordance with claim 35 wherein said step of altering said luminance of adjacent pixel units in said input image to a pre-selected difference in luminance comprises the steps of:

determining the mean of the luminance between adjacent pixel units, and altering the luminance of one said adjacent pixel unit to a value substantially equal to said mean of the luminance less one half of the pre-selected difference in luminance, and altering a second adjacent pixel unit to a value substantially equal to said mean of the luminance plus one half of the pre-selected difference in luminance.

* * * * *

UNITED STATES PATENT AND TRADEMARK OFFICE
CERTIFICATE OF CORRECTION

PATENT NO.    : 6,049,627
DATED         : April 11, 2000
INVENTOR(S)   : Glenn C. Becker et al.

It is certified that error appears in the above-identified patent and that said Letters Patent is hereby corrected as shown below:

Title page,
Item [73], Assignee, should read:
-- Thomson Information Services, Inc.,
   Boston, Mass. --

Signed and Sealed this

Eleventh Day of May, 2004

JON W. DUDAS
*Acting Director of the United States Patent and Trademark Office*